(No Model.)
F. M. EVERINGHAM.
HARROW.
No. 357,377. Patented Feb. 8, 1887.
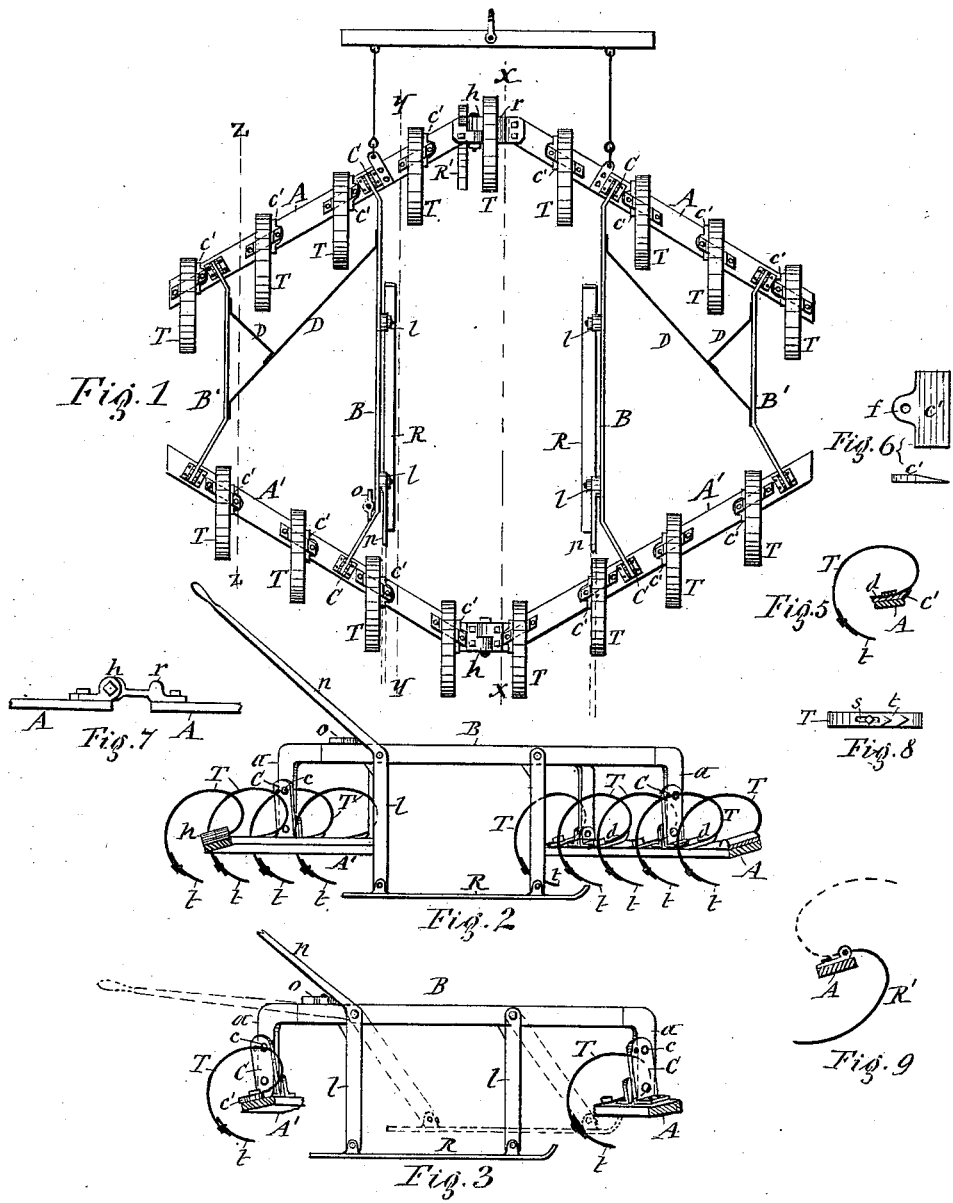

UNITED STATES PATENT OFFICE.

FRANCIS M. EVERINGHAM, OF SYRACUSE, NEW YORK.

HARROW.

SPECIFICATION forming part of Letters Patent No. 357,377, dated February 8, 1887.

Application filed October 25, 1886. Serial No. 217,097. (No model.)

*To all whom it may concern:*

Be it known that I, FRANCIS M. EVERINGHAM, of Syracuse, in the county of Onondaga, in the State of New York, have invented new and useful Improvements in Harrows, of which the following, taken in connection with the accompanying drawings, is a full, clear, and exact description.

This invention relates to the class of harrows which are designated "float-harrows," being deprived of gaging-wheels supporting the harrow-frame at the desired elevation above the ground.

The invention consists, chiefly, in a novel construction of the harrow-frame, composed entirely of flat steel bars, which afford, to a certain degree, flexibility to said frame, and thereby obviate undue strain to the frame and allow the teeth a limited lateral vibration, which causes them to stir the ground more thoroughly, said frame also having its main portion elevated above the teeth-bearing bars or beams, so as to effectually guard against gathering in the harrow weeds, stones, and other substances incapable of being pulverized by the harrow; and the invention furthermore consists in certain peculiarities of its details, as hereinafter fully described, and specifically set forth in the claims.

In the annexed drawings, Figure 1 is a plan view of my improved harrow. Figs. 2, 3, and 4 are vertical transverse sections, respectively, on lines *x x*, *y y*, and *z z*, Fig. 1. Fig. 5 is a vertical transverse section of one of the teeth-bearing bars with a tooth attached thereto. Fig. 6 shows the tooth-leveling shim detached in enlarged plan and end views. Fig. 7 is an enlarged front view of the hinge-connection of the two frame-sections. Fig. 8 is an inverted plan view of one of the teeth, and Fig. 9 is a vertical sectional view showing the shoe or runner adapted to support the central portion of the harrow while hauling the same to and from the field.

Similar letters of reference indicate corresponding parts.

The harrow-frame is composed, chiefly, of two front teeth-bearing beams or cross-bars, A A, two rear teeth-bearing cross-bars, A' A', and longitudinal bars B B', which latter are preferably parallel with the line of draft and are formed at their ends with downward-projecting arms *a a*, to which the cross-bars A A and A' A' are connected, in the manner hereinafter described. Said arms *a a* are of sufficient length to support the intermediate and main portions of the bars B B' at a proper elevation above the plane of the cross-bars to leave the space between the front and rear cross-bars clear and unincumbered, so that any weeds, stones, or other substances which are incapable of being crushed by the harrow may pass freely through the harrow-frame, and thus obviate clogging the harrow. All of the aforesaid bars I form of flat steel bars, the cross-bars being placed flatwise and the longitudinal-bars edgewise to the plane of the frame, thereby affording to the harrow-frame sufficient flexibility to relieve it from undue strain, and at the same time allowing the teeth to vibrate to a certain degree laterally, and thus causing the same to stir the ground more thoroughly.

The cross-bars A A and A' A' are beveled or inclined from their front edges rearward, and the front cross-bars, A A, are disposed divergent from the center of the line of draft, while the rear cross-bars, A' A', are convergent to said line. The result is that in case a lump of earth is encountered by the harrow said lump is caught first under the front cross-bars, and if not immediately crushed thereby the lump is rolled or crowded along under said cross-bars toward the side of the harrow, and during this movement it becomes either entirely or to a greater or less extent reduced. In case the front cross-bars ride over the lump, the rear cross-bar catches it and crowds it back toward the central line of draft, and by the time it reaches this point it is either pulverized or crushed sufficiently to allow the cross-bars to ride over it.

The inclination of the cross-bars I render adjustable by securing posts C C to the top of the bars A A', and hinging to the feet of said posts the lower ends of the arms *a a* of the longitudinal bars B B, and providing each of the upper ends of the posts with two or more holes arranged in an arc described from the aforesaid hinging-point, and adapted to receive the pin or bolt c, passing through the upper end of the arm a aforesaid and through one of the holes in the post. The outer ends of the front cross-bars, A A, are connected with corresponding ends of the rear cross-bars, A' A', by longitudinal bars B' B', hinged at opposite ends to said cross-bars, so as to permit of the aforesaid adjustment. The bars B' B' are firmly secured to the bars B B by diagonal braces D D, as shown in Fig. 1 of the drawings.

The described cross-bars and longitudinal bars form two side sections of a harrow-frame, which are hinged together, as nearly as practicable, on the central line of draft, so that each section can vibrate vertically independent of the other section.

T T denote spring-teeth formed of flat steel bars, curved C-shaped, and having their attaching-shanks d d extending across the cross-bars A A of the harrow-frame on lines parallel with the line of draft, and secured in their proper position on said cross-bars by means of shims c' c', introduced between the inner edges of the attaching-shanks of the teeth and adjacent sides of the cross-bars, and thereby sustaining the teeth in vertical position.

The shim c' has integral with its outer edge an eye, f, and across the top of the shank of the tooth T is placed a clip or strap, which is fastened by bolts passing through the same at opposite edges of the aforesaid shank and through the eye f of the shim and through the cross-bar, and provided with nuts for tightening the clip. To the tops of the inner ends of the cross-bars are rigidly attached hinges h h, by which said cross-bars are coupled together.

On top of one of the leaves of the front hinge is mounted the central tooth, T, which is secured thereto by bolts passing through the shank of the tooth and through the leaf of the hinge and subjacent portion of the cross-bar, and simultaneously fastening the leaf of the hinge on the cross-bar. At the outer edge of the shank of the tooth is a rib, r, projecting from the leaf of the hinge, which rib, together with the eye of the hinge abutting against opposite edges of the shank of the tooth, serves to sustain the said shank laterally.

To the free end of each tooth I attach a steel point, t, which is made adjustable in its position by providing the tooth T with a longitudinal slot, s, for the reception of the bolt by which the point t is attached, as shown in Fig. 8 of the drawings, said slot allowing the point to be set out to compensate for the wear of its end and to project over the end of the tooth the requisite distance. The point is also reversible end for end, so that in case one end is broken or worn out the other end can be brought into use.

In order to permit of transporting the harrow to and from the field without either turning it upon its back or loading it upon a wagon, and to also guide the harrow so as to maintain it in proper position in relation to the line of draft, I adjustably connect to the longitudinal bars B B shoes or runners R, adapted to be set in a plane above the points of the harrow-teeth when the harrow is in use, and in a plane below the aforesaid points to support the harrow elevated from the ground while transporting it to and from the field. The attachment of the runners R, I make by means of arms l l, pivoted to the bars B B and to the runners, one of said arms having rigidly attached to it a lever, n, by which to swing the arms so as to raise the runner a proper distance to allow the teeth to enter the ground and the runners to drag upon the ground and thus guide the harrow. A suitable catch, o, on the bar B, engaging the lever n, holds the same in its depressed position.

To the inner end of one of the cross-bars A, I hinge a runner, R', adapted to be swung into a position to support the central portion of the frame, as represented by full lines in Fig. 9 of the drawings, and adapted to be swung above the frame when the harrow is in use, as indicated by dotted lines in said figure.

Having described my invention, what I claim as new, and desire to secure by Letters Patent, is—

1. A harrow having the points of its teeth inclining forward and the teeth-bearing beams inclining from the front edge rearward to slide over the ground and gage the cut of the teeth, substantially as set forth.

2. In combination with the teeth-bearing beams, longitudinal connecting-bars formed with downwardly-projecting arms connected at their lower ends to the aforesaid beams and carrying the main portions of the longitudinal bars at an elevation above the said beams, substantially as described and shown.

3. A harrow composed of beams disposed at an angle to the line of draft, spring-metal teeth attached directly to said beams, and longitudinal bars connected to the teeth-bearing beams, substantially as described and shown.

4. In a harrow-frame, the combination of longitudinal bars formed with downward-projecting arms and teeth-bearing cross-bars adjustably connected to said arms and adapted to be set into different angles of inclination from their front edges rearward, as set forth and shown.

5. In a harrow-frame, the combination of teeth-bearing cross-bars, posts rising from said cross-bars, and longitudinal bars formed with downward-projecting arms pivoted to one end of the respective posts and secured adjustably to the other end of the said posts, substantially as described and shown.

6. In a harrow-frame, the combination of teeth-bearing cross-bars, longitudinal bars hinged on said cross-bar, and longitudinal bars connected adjustably to the cross-bars to allow the latter to be set into different angles of inclination, substantially as set forth and shown.

7. A harrow-frame composed of front teeth-bearing cross-bars disposed divergent from the center of the line of draft, rear teeth-bearing cross-bars disposed convergent to the said line of draft, and longitudinal bars connected to said cross-bars and elevated above the same between their points of attachment, substantially as set forth and shown.

8. In a harrow-frame, the combination of front and rear teeth-bearing cross-bars disposed, respectively, divergent and convergent from the center of line of draft and hinged together on said line, and longitudinal bars connected adjustably to said cross-bars to allow the latter to be set into different angles of inclination from their front edges rearward, and the intermediate portions of the longitudinal bars elevated above the plane of the aforesaid cross-bars, all constructed and combined substantially as described and shown.

9. In combination with the cross-bars disposed inclining from their front edges rearward and at an angle to the line of draft, the spring-teeth shanks placed across said bars parallel with the line of draft, leveling-shims introduced between one of the edges of the teeth-shanks and cross-bars, and fastening devices for securing the teeth and shims to the cross-bars, as set forth and shown.

10. In combination with the cross-bars disposed inclining from their front edges rearward and at an angle to the line of draft, the spring-teeth shanks placed across said bars parallel with the line of draft, leveling-shims introduced between one of the edges of the teeth-shanks and cross-bars and having integral with them eyes projecting at the sides of the teeth-shanks, clips placed across the latter, and bolts passing through the clips and through the aforesaid eyes and cross-bars, substantially as described and shown.

11. The combination, with the cross-bars, of a hinge attached to the adjacent ends of said bars and connecting the same together, a spring-tooth mounted on one of the leaves of said hinge, and a rib on said leaf abutting against the side of the tooth, substantially as described and shown.

In testimony whereof I have hereunto signed my name and affixed my seal, in the presence of two attesting witnesses, at Syracuse, in the county of Onondaga, in the State of New York, this 19th day of October, 1886.

FRANCIS M. EVERINGHAM. [L. S.]

Witnesses:
C. BENDIXON,
H. P. DENISON.